April 26, 1949.   C. S. TAYLOR   2,468,382
INLET SCREEN FOR DECONTAMINATORS
Filed March 26, 1946
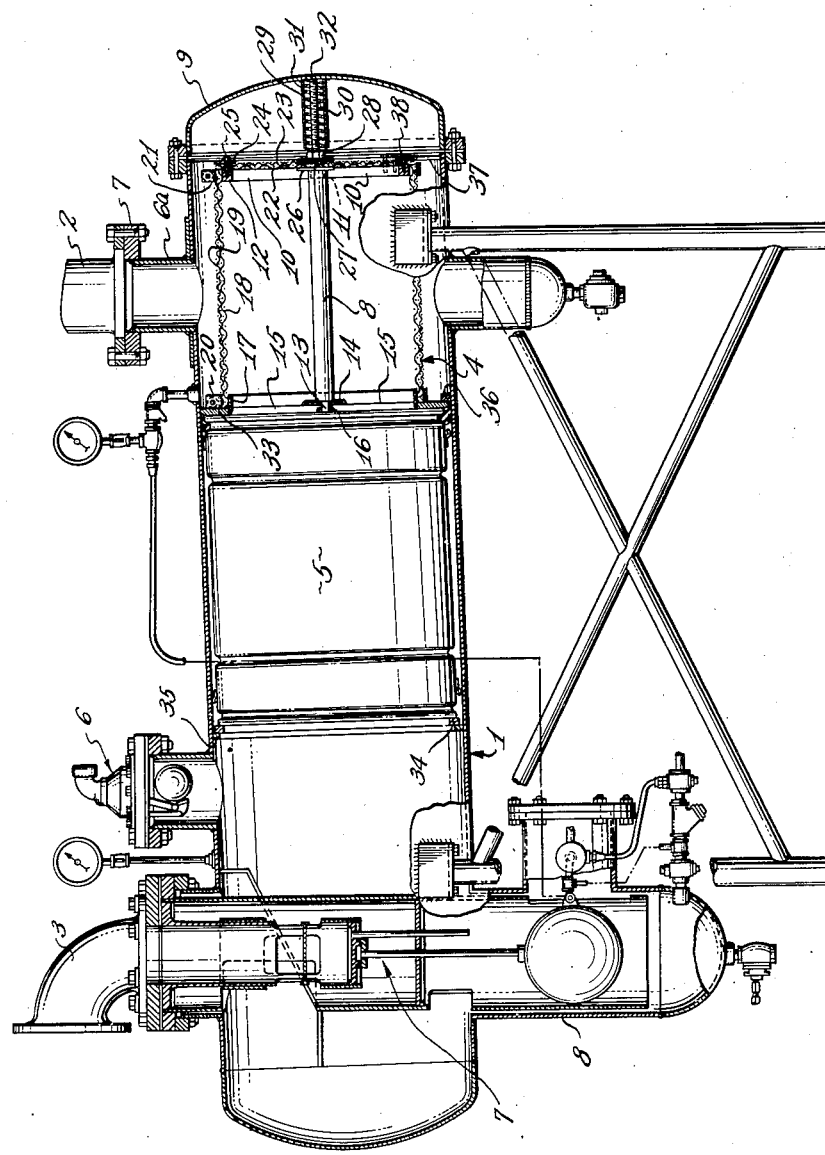
INVENTOR.
CHARLES S. TAYLOR
BY Harold W. Mattingly
Attorney Patented Apr. 26, 1949

2,468,382

UNITED STATES PATENT OFFICE 2,468,382

INLET SCREEN FOR DECONTAMINATORS

Charles S. Taylor, Los Angeles, Calif., assignor to Aircraft Fueling Company, Inc., Los Angeles, Calif., a corporation of California Application March 26, 1946, Serial No. 657,275

1 Claim. (Cl. 210—44)

My invention relates to decontaminating apparatus for removing undesired substances from fluids, and has particular reference to an inlet screen construction which finds particular utility when employed to remove solid materials from petroleum fluids.

In my copending application Serial No. 657,276, filed March 26, 1946, and entitled "Decontaminator for petroleum fluids," I point out the necessity for employing a decontaminating apparatus between fuel or gasoline storage tanks at fueling stations and the fuel tanks of vehicles to be serviced to remove entrapped air, emulsified water and solid materials inadvertently present in the petroleum fluid to insure delivery to the fuel tanks of the vehicle pure, unadulterated fuel, such as gasoline. In that application I have disclosed and claimed a decontaminating apparatus which is particularly suitable for delivering pure and unadulterated fluids to the fuel tanks of the vehicle. In that application mention is made of the employment of an inlet filter or screen for removing from the fluids any solid material that may be present. Preferably such an inlet screen is located ahead of the cartridge contained in the coagulating medium so as to reduce to a minimum the tendency of the coagulating medium to be clogged and eventually rendered useless by the trapping in that medium of small particles of solid material.

An inlet screen or filter for use in apparatus of the character above referred to must operate to remove all but the very finest of solid particles to prevent a premature clogging of the coagulating medium. Furthermore, despite its property of removing very small particles, it must be so constructed as to minimize the pressure drop through the screen to prevent the production of undesirable back pressure on the fueling system. Furthermore, the screen must be so arranged as to permit it being cleaned at a minimum expenditure of time and effort so as to minimize the time during which the decontaminating apparatus is out of service for the purpose of cleaning the inlet screens.

It is therefore an object of my invention to provide an inlet filter or screen for petroleum fluid decontaminators which includes a screen of very fine mesh for removing particles of very small size and in which the screen area is made very large to minimize the resistance to flow of fluid through the screen.

It is also an object of my invention to provide an inlet filter of the character set forth in the preceding paragraph which includes a screen supporting structure for preventing collapse of the fine screen by the fluid pressure differential between opposite sides of the screen.

It is a still further object of my invention to provide an inlet filter or screen construction of the character hereinbefore referred to which includes a mechanism for removing solid material caught by the screen without requiring the screen to be removed from the decontaminator.

It is an additional object of my invention to provide an inlet screen construction of the character set forth hereinbefore which includes a means permitting the ready and rapid removal of the screen from the decontaminator for cleaning or replacement purposes.

It is also an object of my invention to provide a device of the character hereinbefore referred to, which is so arranged as to permit the screen to be removed from the decontaminator without requiring the fluid connections to the decontaminator to be disturbed.

Other objects and advantages of my invention will be apparent from a study of the following specifications, read in connection with the accompanying drawing wherein the single figure is a side elevational view with parts broken away and parts shown in section and illustrating my invention as employed in a petroleum fluid decontaminator of the character set forth in my above mentioned copending application.

Referring to the drawing, I have illustrated a petroleum fluid decontaminating apparatus of the character described and claimed in my aforementioned copending application. Described briefly, the decontaminator comprises a treatment chamber 1 which is provided with an inlet connection 2 through which fluid to be treated may be conducted to the interior of the chamber 1. An outlet connection 3 is provided for discharging treated fluid to pipe lines or hoses which are to be extended to the fuel tanks of the vehicle being serviced.

Within the chamber 1 there is positioned an inlet screen indicated generally at 4 and to be described in detail hereinafter. The fluid to be treated after passing through the inlet screen 4 is forced to pass through a cartridge 5 containing a coagulating medium operating to separate entrapped air from the petroleum fluid and to coagulate a water emulsion of said petroleum fluid so that at the discharge side of the cartridge 5 the air will emerge in the form of relatively large bubbles at the top of the chamber while the water will emerge from the cartridge in the form of large drops or "slugs" at the bottom of the chamber. While any suitable form of cartridge containing a suitable coagulating medium may be employed and held in any suitable manner within the chamber 1, I prefer to use a construction of the character which is disclosed in my copending application Serial No. 657,277 (now abandoned), filed March 26, 1946, and entitled Cartridge-type decontaminator for petroleum fluids.

The mechanism includes an air relief valve indicated generally at 6 for discharging the air at substantially the same rate as it is accumulated. Similarly a control mechanism indicated generally at 7 and mounted in a sump 8 for collecting the removed water operates to effect and control the discharge of water from the chamber. In my aforementioned copending application the control mechanism 7 is described in detail.

As is shown in the drawing, the influx of untreated fuel from the inlet 2 is through a relatively small diameter stand 6a providing a drilled flange 7 for the attachment of the inlet connection 2 of conventional construction. An inlet screen is indicated generally by the reference character 4. This screen constitutes a cylinder disposed with its axis parallel to the axis of the chamber 1 and is arranged to be removed from the chamber 1 from the open end of the chamber following removal of a removable head 9 secured to the end of the chamber 1 by conventional flanges and bolts.

The screen 4 comprises a plurality of layers of screen material supported upon a skeleton supporting structure. This structure comprises a central rod 8, to the right-hand end of which is affixed a pair of crossed radially extending bars 10 and 11. To the outer ends of these bars is secured a ring 12. The left-hand end of the rod 8 is made with a reduced diameter pin portion 13 which is passed through a suitable aperture in a stiffener plate 14. The stiffener plate 14 is secured to two crossed radially extending arms 15 and 16. To the outer ends of the arms 15 and 16 there is secured an inner supporting ring 17. About the rings 12 and 17 and extending therebetween there is first placed an inner cylinder 18 of relatively coarse or strong screen material such as expanded metal. About this there is placed one or more layers of a fine screen material 19 such as 100 mesh screen wire. These cylinders are secured in place by means of clamping rings 20 and 21 encircling the screens 18 and 19 opposite the rings 12 and 17 to clamp the screen cylinders against the rings.

The otherwise open right-hand end of the screen cylinder is closed by inner and outer disks 22 and 23 formed of coarse and fine screen material, respectively. These disks are held in place by an annular clamping ring 24 which is secured to the ring 12 as by means of screws or bolts 25.

The rod 8 is provided with a reduced diameter portion which passes through washers 26 and 27 positioned on opposite sides of the disks 22 and 23 and is threaded to receive a nut 28 used to clamp the washers against the shoulder formed by the reduction in diameter of the rod 8. The extreme right-hand portion of the rod 8 is further reduced in diameter as shown at 29 to be encircled by a compression spring 30.

To the inner surface of the removable cap 9 there is secured a sleeve 31 having a diameter sufficient to freely receive the spring 30. The rod portion 29 is made of a length sufficient to provide a small amount of clearance as shown at 32 between the right-hand end of the rod and the inner surface of the cap 9. This is to limit the extent of movement to the right which may be imparted to the screen assembly 4 by the swelling of the coagulating medium contained within the cartridge 5.

The left-hand screen supporting ring 17 is by preference secured to a clamping ring 33 which engages the end of the cartridge 5 to hold the same in position within the chamber. The spring 30 thus serves to hold both the cartridge 5 and the screen assembly 4 in the desired position within the chamber 1, it being understood that movement to the left of the assembly, including the cartridge 5, is prevented by stop rings 34 and 35 suitably secured within the chamber 1.

In order to facilitate installation of the screen assembly 4 and to hold the same centered until the removable cap 9 is replaced to clamp the screen assembly 4 by means of the spring 30, I secure to the bottom portion of the ring 33 a small foot 36 so located as to hold the left-hand end of the assembly at the proper elevation when the foot 36 engages the bottom of the chamber 1. Similarly a pair of legs 37 secured as by means of bolts 38 to the ring 12 operates to hold the outer end of the assembly 4 at the proper elevation. The two legs 37 and the one leg 36 provide a three-point support engaging the inner surface of the chamber 1 to center the screen assembly within the chamber.

From the foregoing it will be noted that I have provided an inlet screen which is particularly suitable for use with decontaminators of the character referred to in my first aforementioned copending application. Attention is directed particularly to the fact that the screen assembly is so constructed as to provide an adequate support for the fine screen material to prevent the same from being collapsed as a result of the pressure differential between opposite sides of the screen.

Attention is also directed to the fact that provision is made for easy and quickly removing the entire screen assembly for the purpose of cleaning or replacement.

While I have shown and described the preferred embodiment of my invention, I do not desire to be limited to any of the details of construction shown or described herein, except as defined in the appended claim.

I claim:

In a decontaminating apparatus, the combination of: an elongated cylindrical treatment chamber having an inlet adjacent one of its ends and an outlet adjacent the other of its ends and having a full diameter removable closure at the inlet end of said chamber, a stop ring extending circumferentially about the interior of said chamber and projecting inwardly thereof, a cartridge containing a coagulating medium in said chamber abutting said stop ring, a cylindrical screen disposed between said cartridge and said closure, said screen comprising a rigid screen supporting structure including end rings spaced from each other along the longitudinal axis of said chamber, and compression spring means interposed between said closure and the end ring adjacent said closure to force said screen against said cartridge and to force said cartridge against said stop ring.

CHARLES S. TAYLOR.

REFERENCES CITED

The following references are of record in the file of this patent:

UNITED STATES PATENTS

| Number | Name | Date |
|---|---|---|
| 313,693 | Thornton | Mar. 10, 1885 |
| 1,137,480 | Gwynn | Apr. 27, 1915 |
| 1,223,299 | Taylor | Apr. 17, 1917 |
| 1,581,947 | Hobbs | Apr. 20, 1926 |
| 1,839,350 | Slagel | Jan. 5, 1932 |
| 1,909,022 | Spohr | May 16, 1933 |
| 1,931,764 | Lawson | Oct. 24, 1933 |
| 2,082,847 | Petty | June 8, 1937 |
| 2,104,519 | Hurn | Jan. 4, 1938 |
| 2,363,009 | Lewis | Nov. 21, 1944 |
| 2,412,841 | Spangler | Dec. 17, 1946 |